(12) United States Patent
Nelson et al.

(10) Patent No.: US 8,479,147 B2
(45) Date of Patent: Jul. 2, 2013

(54) SERVER-PAGE BASED SOFTWARE ARCHITECTURE ENABLING USE-CASE ORIENTED EVOLUTIONARY SOFTWARE PROTOTYPING

(75) Inventors: Christopher Roy Nelson, Pittsburgh, PA (US); Xiping Song, Cranbury, NJ (US); Herbert R. Foster, Jr., Princeton, NJ (US); Gilberto Augusto Matos, Plainsboro, NJ (US); Rajanikanth Tanikella, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 2116 days.

(21) Appl. No.: 11/303,698

(22) Filed: Dec. 16, 2005

(65) Prior Publication Data

US 2006/0156279 A1    Jul. 13, 2006

Related U.S. Application Data

(60) Provisional application No. 60/643,280, filed on Jan. 12, 2005.

(51) Int. Cl.
*G06F 9/44*    (2006.01)

(52) U.S. Cl.
USPC .......................................... 717/104; 717/120

(58) Field of Classification Search
USPC ............................................... 717/104, 120
See application file for complete search history.

(56) References Cited

U.S. PATENT DOCUMENTS

| | | | | |
|---|---|---|---|---|
| 6,308,178 B1 * | 10/2001 | Chang et al. | ................... | 707/100 |
| 6,360,249 B1 * | 3/2002 | Courts et al. | ................... | 709/203 |
| 6,983,421 B1 * | 1/2006 | Lahti et al. | ..................... | 715/763 |
| 7,076,762 B2 * | 7/2006 | Fisher | ............................ | 717/102 |
| 7,103,627 B2 * | 9/2006 | Kittredge et al. | .............. | 709/201 |
| 7,188,163 B2 * | 3/2007 | Srinivasan et al. | ............. | 709/221 |
| 7,194,473 B1 * | 3/2007 | Hichwa et al. | ................. | 707/101 |
| 7,246,319 B2 * | 7/2007 | Alden et al. | ................... | 715/738 |
| 7,316,003 B1 * | 1/2008 | Dulepet et al. | ................. | 717/111 |
| 2002/0156815 A1 * | 10/2002 | Davia | ............................ | 707/517 |

OTHER PUBLICATIONS

Fabrice Kordon, et al., "An Introduction to Rapid System Prototyping," *IEEE Transactions on Software Engineering*, vol. 28, No. 9, Sep. 2002 pp. 817-821.

Robert Chatley, et al., "Model-Based Simulation of Web Applications for Usability Assessment," *Dept of Computing, Imperial College London*, pp. 5-11.

* cited by examiner

*Primary Examiner* — Li B Zhen
*Assistant Examiner* — Hang Pan
(74) *Attorney, Agent, or Firm* — Donald B. Paschburg; F. Chau & Associates, LLC (57) ABSTRACT

A system for use-case software development includes an interface renderer for interpreting a user interface definition code and displaying a user interface, a request dispatcher for processing a request from the interface renderer, and a request handler for processing the request and checking a use-case name contained in the request. The system further includes a use-case handling program, invoked by the request handler, for performing logic defined by a use-case corresponding to the use-case name and according to a use-case state and returning an interface definition specifying an interface layout and controls that are interpretable by the interface renderer, and a server page container for receiving the interface definition and providing the user interface definition code to the interface renderer.

9 Claims, 5 Drawing Sheets

SERVER-PAGE BASED SOFTWARE ARCHITECTURE ENABLING USE-CASE ORIENTED EVOLUTIONARY SOFTWARE PROTOTYPING

This application claims priority to U.S. Provisional Application Ser. No. 60/643,280, filed on Jan. 12, 2005, which is herein incorporated by reference in its entirety.

BACKGROUND OF THE INVENTION

1. Technical Field

The present invention relates to web based software applications, and more particularly to is a server-page based software architecture that uses a use-case to drive development and maintenance of an evolving, web based software application.

2. Discussion of Related Art

Rapid software prototyping is an approach to facilitating the communications between customers and requirement engineers in defining software requirements, helping to gain an early customer buy in product ideas, managing the product risk by exploring the feasibility of the software development, and evaluating alternatives in which software can be built. Based upon different emphases for those goals, a software prototype can be classified as a throwaway software prototype, a mock-up, or an evolutionary prototype. For the throwaway software prototype, the requirement is the delivery rather than the software. For the mock-up, the prototype is used to gather the requirement and customer buy-in. Data used in the mock-up prototype is faked. The evolutionary prototype uses real data and the prototype evolves into a product.

An important challenge in developing an evolutionary prototype is how to ensure the software implementation is traceable from the software requirements, easy to modify, and behaves consistently when being invoked by different application functions. To add or modify an existing feature, the software developers need to trace the feature in the software requirements to the specific software prototype code for modifying. The developers need to ensure that the modification will change the software behaviors consistently over different invocations of the same feature and should not impact other features improperly.

Technologies that have been used to support user workflows in a web application include Business Process interpreters and scenario-based simulation.

The Business Process interpreter supports a workflow, using Microsoft® Active Server Page technology to get HTTP requests from the web page. The Business Process interpreter uses Microsoft® COM (Component Object Model) technology to set and save a context for the workflow, and interpret business process definitions that are defined in an XML format. The Business Process interpreter is not designed for systematically evolving the software from a prototype to a product.

Scenario-based simulation supports the implementation of scenarios for the prototyping purpose. Each request from the web page is processed to generate a XML definition of the user interface. This definition is further translated to HTML for displaying. Scenario-based simulation prototypes can only provide the user look and feel, and limited system behaviors. For example, the prototype may not be used to validate the system architecture vertically and the system behaviors that use real data. Scenario-based simulations lack a detailed and structured approach of evolving a prototype to a product.

Therefore, a need exists for a system and method for is a server-page based software architecture using a use-case to drive the evolutionary, rapid development and easy maintenance of a highly evolving, web based software application.

SUMMARY OF THE INVENTION

According to an embodiment of the present disclosure, a system for use-case software development comprises an interface renderer for interpreting a user interface definition code and displaying a user interface, a request dispatcher for processing a request from the interface renderer, and a request handler for processing the request and checking a use-case name contained in the request. The system further comprises a use-case handling program, invoked by the request handler, for performing logic defined by a use-case corresponding to the use-case name and according to a use-case state and returning an interface definition specifying an interface layout and controls that are interpretable by the interface renderer, and a server page container for receiving the interface definition and providing the user interface definition code to the interface renderer.

The request dispatcher determines that the request handler is responsible for the request and assigns the request to the request handler. The request includes a pattern of a uniform resource locator, and the request dispatcher determines which request handler the request is assigned to according to the uniform resource locator.

The interface definition reads an interface layout control of the user-case handling program and determines the interface layout.

The computer system for use-case software development comprises a built-in data component hard-coded in the use-case handling program, a selectable data component loaded into the use-case handling program based upon a user selection, and a semi-complete data component representing a data set for implementing variants of the use-case. Each of the built-in data component, the selectable data component and the semi-complete data component correspond to different levels of development of the use-case.

The use-case handling program links a plurality of use-cases together as a web-base software application.

The computer system for use-case software development comprises a client-side and a server-side, wherein the client-side comprises the interface renderer and the server-side comprises the request dispatcher, the request handler, the use-case handling program, and the server-page container.

According to an embodiment of the present invention, a method for development of a of web-based software application comprises identifying a function to add to the web-based software application, creating a request handler for an identified function, and identifying a use-case for implementing a feature of the identified function. The method comprises implementing the use-case in a handling program code, an interface layout control code and an interface definition comprising built-in data, wherein the handling program code links a use-case implementation to the web-based software application, determining a generalization of the use-case implementation, modifying the use-case implementation to retrieve predetermined selectable data according to the generalization, and modifying the use-case implementation to receive user-input data.

The handling program code links the use-case to one or more other user-cases of the web-based software application.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a server-page (e.g., JavaServer Page™ (JSP™) or Active Server Page (ASP)) based software architecture uses a use-case to drive evolutionary, development and/or maintenance of an evolving, web-based software application. The software application may have changing/maturing requirements. The architecture enables the linking of the use-case with one or more existing use-cases of the developed software.

The use-case is a technique for capturing requirements of a software application or a modification/addition to be made in the software application. Each use-case provides one or more scenarios that convey how the system should interact with a client (e.g., end user) or another system to achieve a goal. The use-case is determined from a point of view of the needs of the client or user of the software application.

According to an embodiment of the present disclosure, a function is a set of user-interactions with the software application to achieve some business application goal, such as checking a patient into a health care application. Hereinafter, the use-case refers to an execution of an instantiation(s) of the function (e.g., check in a particular patient such as John) or functions. The use-case is generalized into a set of use-cases that include similar functional characteristics (e.g., check-in a patient with Medicare insurance). A feature is one or more user-interactions within the use-case to achieve a sub-goal (e.g., verify the patient insurance during the check-in function). The feature may achieve a part of a function or an entire function.

The software architecture, according to an embodiment of the present disclosure, dynamically defines how the server-page based user interface (e.g., JSP) is constructed according to the use-cases being performed. For example, consider:

(AA)
```
public class XEventHandler extends BaseEventHandler {
    public IDispatcher execute( ) throws SystemException {
        String jsp;
        String action = getAction( );
        System.out.println(action);
        if (action.equals("ToggleView")) {
            jsp = toggleGraphicView( );
        } else if (action.equals("Refresh")) {
            jsp = refresh( );
        } else if (action.equals("Home")) {
            jsp = goHome( );
        } else if (action.equals("Next")) {
            jsp = doNext( );
        ...
        } else {
            jsp = "Demo.jsp";
        }
        return new ForwardDispatcher(jsp);
    }
}
```

(BB)
```
private String doNext( ) {
    synchronized(getRequest( ).getSession( )) {
        XControl control = (XControl)
getRequest( ).getSession( ).getAttribute("myControl");
        try {
            control.setScreenHeader("ScreenHeader.jsp");
            control.setScreenBody("ScreenBody.jsp");
    control.setScenarioHeader("PatientHeader.jsp");
            control.setScenarioBody("ScenarioBody.jsp");
    control.setScenarioNavigation("ScenarioNavigation.jsp"
);
            if (control.isInGraphicalViewMode( )) {
    control.setScenarioWell("../X/graphic_view.html");
            } else {
    control.setScenarioWell("../X/tabletemplate17_bedlist.html");
            }
        } catch (Exception e) { }
    }
    return "Demo.jsp";
}
```

A request-handling component (see for example, AA) of the architecture processes a request made from the user interface (e.g., ToggleView, Refresh, doNext) and performs a desired operation depending on a state of a current use-case. With this architecture, a use-case can be effectively supported.

(CC)
```
<jsp:useBean id="myControl"
class="com.siemens.med.hs.soarian.financial.ui.Control"
scope="session" />
<% myControl.incrementCount( ); %>
<html>
<head>
<title>Soarian Vision Demo - <jsp:getProperty
name="myControl" property="useCase" /></title>
<meta http-equiv="Content-Type" content="text/html;
charset=iso-8859-1">
<link href="../sfStylesheets/master.css" rel="stylesheet"
type="text/css">
</head>
<icc:body>
<table border="0" cellpadding="0" cellspacing="0"
width="100%">
    <tr>
        <td height="56px" width="100%">
            <% String screenHeader = myControl.getScreenHeader( );
                if ( screenHeader.equals("ScreenHeader.jsp") ) {
%>
            <%@ include file="ScreenHeader.jsp" %>
            <% } %>
        </td>
    </tr>
    <tr>
        <td>
            <% String screenBody = myControl.getScreenBody( );
                if ( screenBody.equals("../X/Home.jsp") ) { %>
            <%@ include file="../X/Home.jsp" %>
            <% } else if (
screenBody.equals("../X/BedBoardHome.jsp") ) { %>
                <%@ include file="../X/BedBoardHome.jsp" %>
            <% } else if ( screenBody.equals("Login.jsp") ) { %>
                <%@ include file="Login.jsp" %>
            <% } else if ( screenBody.equals("ScreenBody.jsp") )
{ %>
                <%@ include file="ScreenBody.jsp" %>
            <% } %>
        </td>
    </tr>
```

The architecture enables a systematic software process for the development and maintenance of an evolving server-page based application. This process defines an explicit approach of evolving a use-case (e.g., check-in a particular kind of patients) to a more complete function (e.g., check in patients of many kinds).

Related use-cases may be linked (e.g., link "emergency room check in" with "hospital direct admit") to support a business application workflow, wherein a modification of a feature will consistently change related use-cases that invoke the same feature. The architecture structures the code corresponding to the use-cases defined in the software requirements, enabling the tracing from the software requirements to the prototype code.

For example, consider a workflow implemented by a pair of matched Java classes: the EventHandler, and Control object (see for example, AA and CC, respectively). These Java classes encapsulate a behavior that is needed from the workflow support. The Control object includes references to the JSP pages that will be used to render the browser's user interface supporting the workflow. The workflow specific pages are grouped into a single directory. The directories for the Java and JSP objects for specific workflows are named according to the name of the workflow, to preserve traceability, for example see CC.

Linking between workflows is performed by replacing the current Java object reference in the session scope with the event handler of the linked workflow. If changes are made within a specific workflow, either to the Java handlers, or to the associated JSP pages, these changes are available regardless of the event history that invoked the modified workflow.

Figure 1:
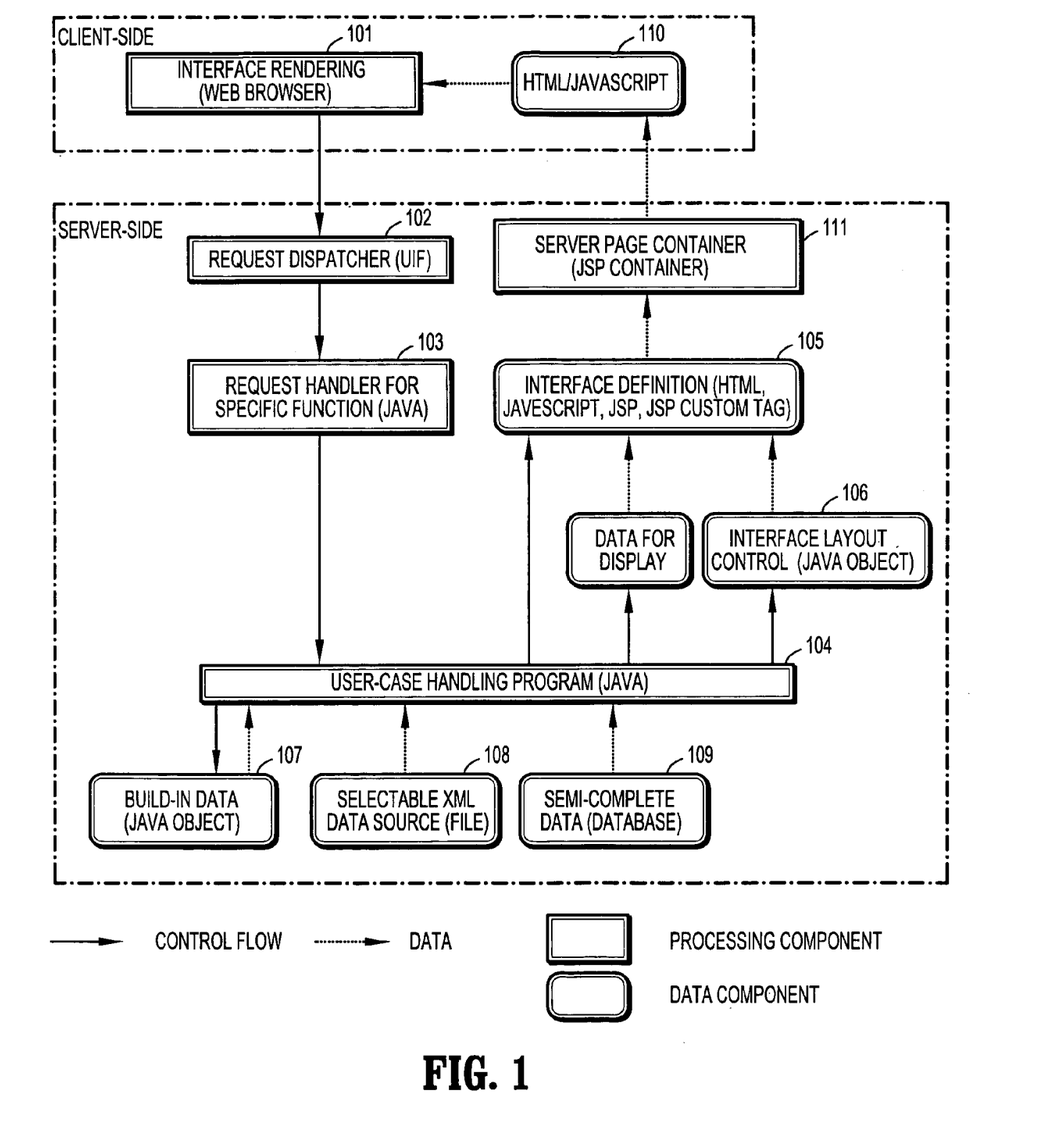
FIG. 1 is a diagram of a system according to an embodiment of the present disclosure.

Referring to FIG. 1, a system architecture for use-case software development/maintenance according to an embodiment of the present disclosure includes processing components and data components. Exemplary technologies that may be used to implement the components are shown within the parenthesis. The processing components include an interface renderer 101, a request dispatcher 102, a request handler 103, a use-case handling program 104, an interface definition 105, and an interface layout control 106. The data components include built-in data 107, selected XML data sources 108, and semi-complete data 109.

Figure 2:
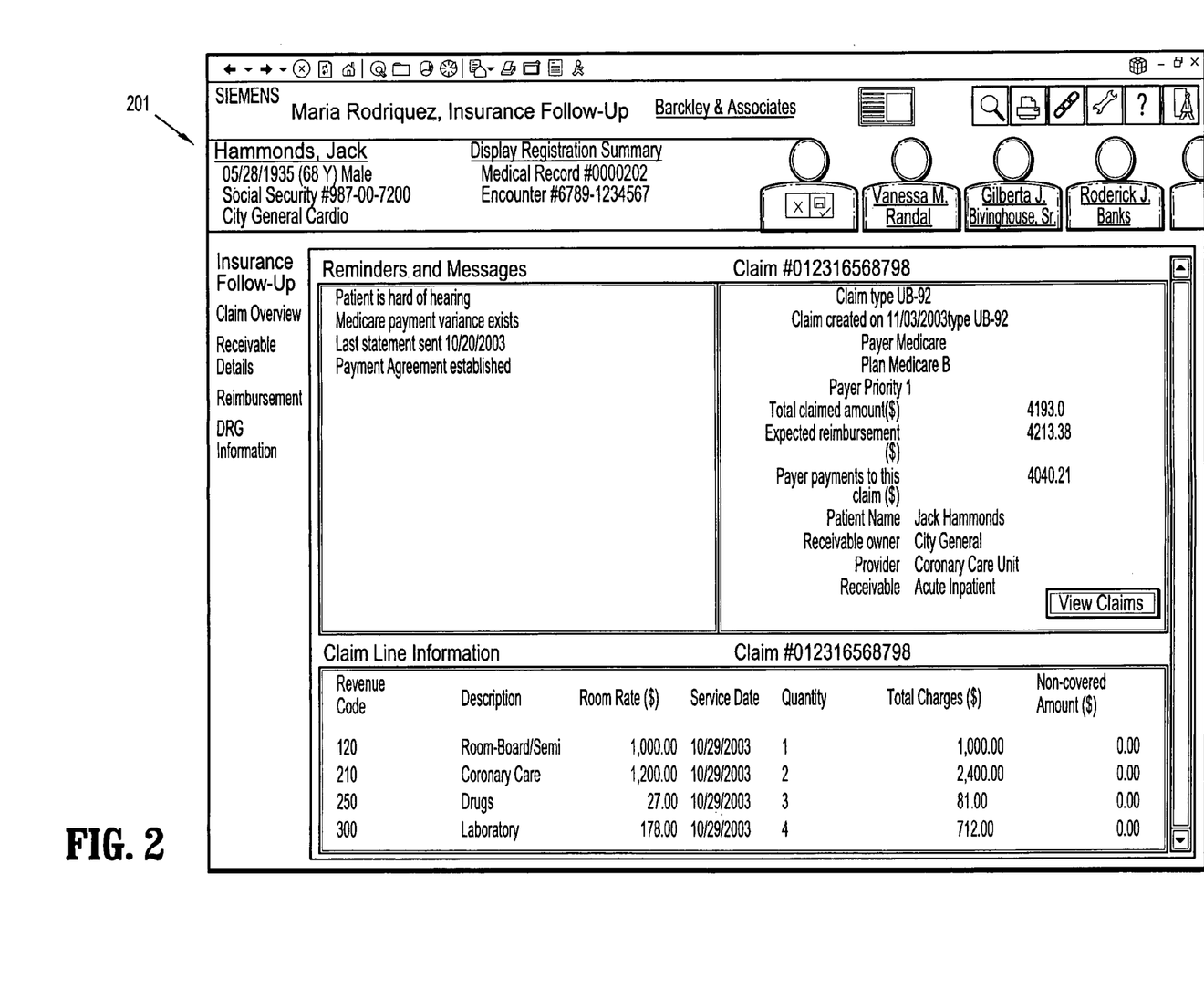
FIG. 2 is an illustration of a user-interface (e.g., a use-case) according to an embodiment of the present disclosure.
Figure 3:
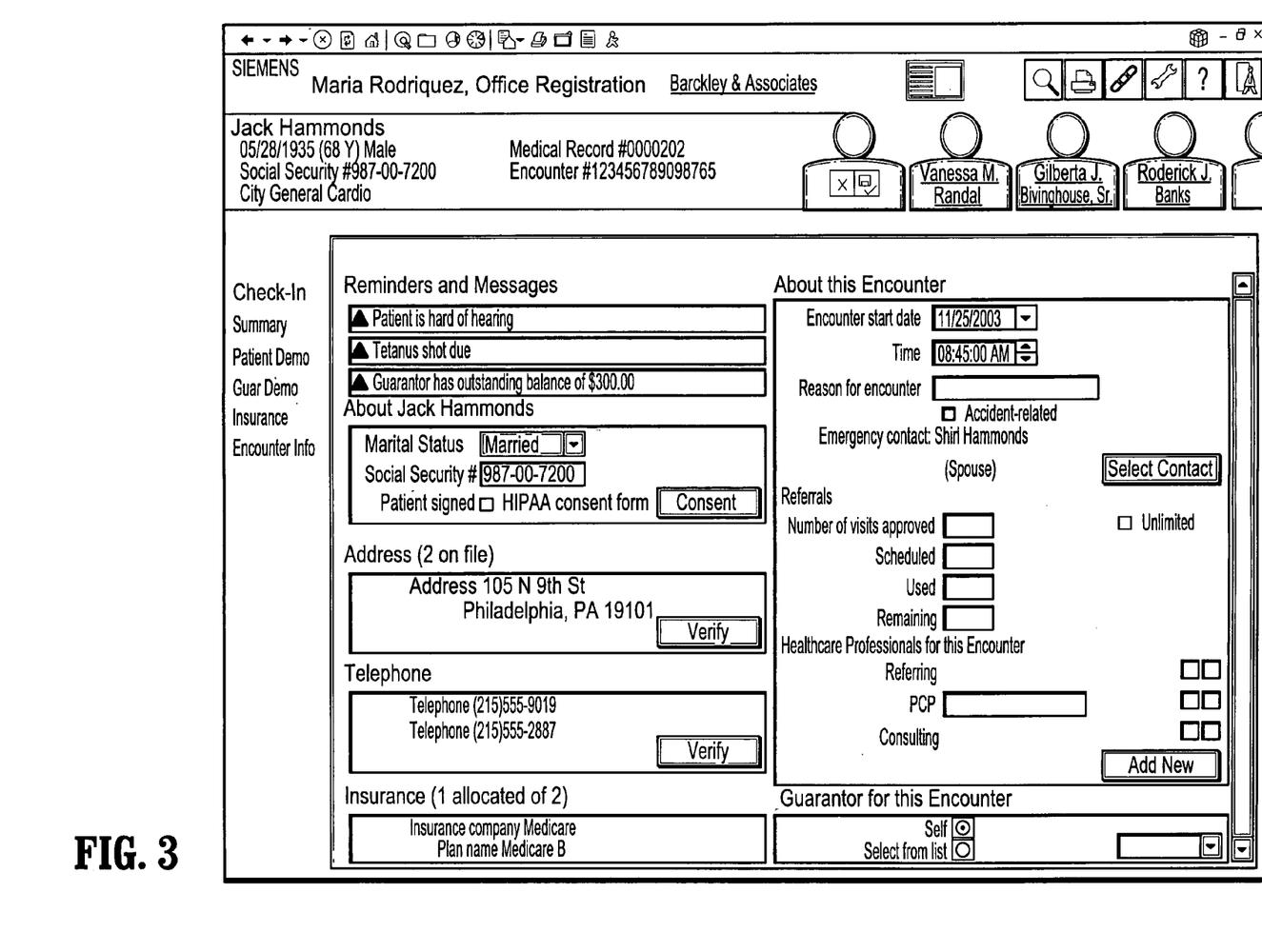
FIG. 3 is an illustration of a user-interface (e.g., a use-case) according to an embodiment of the present disclosure.

The interface renderer 101 interprets user interface definition code 110 (e.g., HTML such as AA and BB, and JavaScript such as CC) and displays a user interface (see for example, FIGS. 2 and 3. The interpretation and display is supported with a web browser. The request dispatcher 102 processes an HTTP request from the user interface and assigns it to the request handler 103 that is responsible for handling a given request (e.g., check-in a patient). The request Uniform Resource Locator's (URL) pattern determines which request handler will be used. This may be implemented with a Siemens' software application called UIF (Unified Interface Framework). The request handler 103 processes the request content value and checks the use-case name contained in the request. The request handler 103 invokes the use-case handling program 104 that performs the business logic defined by the use-case (e.g., record a patient as having been checked into a hospital). The use-case handling program 104 (see for example, AA) performs the business logic according to the use-case state (e.g., record a patient as having been checked into a hospital) and returns an interface definition for further user interactions. The interface definition 105 specifies the interface layout and controls that are interpretable by the interface renderer 101 and server page container 111 (e.g., JSP container). The interface definition 105 reads the interface layout control 106 (see for example, BB) and determines how the user interface details should be constructed. The interface definition 105 may be implemented with JSP, JSP Custom tags, HTML, JavaScript, etc. The interface layout control 106 defines the details of the user interface and provides the information needed for the user interface to be rendered by the web browser 101 and server page container 111. For example, it defines which JSP file (see for example, CC) should be included for a predefined area in the user interface during the is interface rendering. The interface layout control 106 may be implemented as a Java object.

Referring to the data components, the built-in data 107 are hard-coded in the use-case handling program 104. This implementation is used during the early phase of the prototyping to prototype a particular use-case (e.g., check in a patient who has an insurance). Selectable XML data 108 are loaded into the use-case handling program 104 based upon the user selection. Users can select which data set to use to support different variants of the use-case (e.g., check in patient who has an insurance or has no insurance). This implementation is used when at least one variant of the use-case has been implemented (e.g., check in a patient who has no insurance). Semi-complete data 109 represent the data set that is needed for implementing the variants of the use-case being prototyped (e.g., check in patients who are with and without insurance). When the data set is incremented to support all the use-cases represented by the function (e.g., check-in), the entire function can be implemented evolutionarily.

The architecture uses the use-case as a driving force for evolutionary development and software requirement tracing. Each software requirement is mapped to a use-case and implemented with a use-case handling program or a linking of the existing use-cases. Thus, a new use-case can be incrementally implemented into the software and the changes to the use-case can be easily traced to the implementation.

When a new use-case (e.g., direct admit to a hospital) is to be connected with the currently running use-case (e.g., quick patient check-in), the use-case handling program will change the current use-case name (e.g., quick check-in) to the one (e.g., direct admit) to be connected in the interface layout control 106. In addition, the interface layout control 106 is initialized with the data value (e.g., patient name) from the existing one. For example, the part of the data values in the existing interface layout control 106 are passed to the new use-case handling program 104.

Within the architecture, the use-case executions can be connected. For example, FIGS. 2 and 3 are illustrations of the user interface that supports an insurance follow-up in a healthcare financial application. Within this exemplary use-case, if a user wants to move to another use-case that is to check in the patient, a hyperlink 201 (e.g., patient name in the header) may be selected form an user interface corresponding to an insurance follow-up use case (see FIG. 2) to move to the patient check-in use-case (see FIG. 3).

The event handler receives the identification of the user-specified event, which can be processed as an internal, shared or use-case linked event. Internal events are processed by the current event handler, using the existing contents of the session scope. Shared events are delegated to some of the shared event handlers, which are known in advance to the specific event handlers, and also are based on the existing contents of the session scope. The current event handler is replaced by a new event handler to link use-cases, which may also entail changes in the contents of the session scope. In this case the event handler effectively "pushes" its own context to the ContextRepository, which remains available for retrieval after the linked scenario is completed.

(DD)

```
private void detailAction( ) throws SoarianSystemException {
        int detailActionIndex = new Integer((String)
            getRequest( ).getParameter(SELECTED_ACTION_KEY
            )).intValue( );
        FunctionDTO[ ] actions =
getForm( ).getPossibleActions( );
        try {
            // Protect current event context in global
repository
            createContext( );
            // Get the event handler to handle the
linked action
            String eventHandlerClassName =
actions[detailActionIndex].getEventHandler( );
            Class actionClass =
Class.forName(eventHandlerClassName);
            AbstractEventHandler handler =
(AbstractEventHandler) actionClass.newInstance( );
            // New event handler retrieved from a
scenario name mapping
            // Set the action for the new event handler
to 'init'
        getEventParameters( ).setAction(INIT_ACTION_KEY);
        handler.setEventParameters(getEventParameters( ));
            handler.executeSpecificEvents( );
            // New event handler initialized the session
state
        } catch (Exception e) {
            // ignore this exception
            // e.printStackTrace( );
        }
    }
```

Referring to EE, the linked event handler prepares the session context for its needs. The main session context adjustment is to replace the Control object, with the one that is matched with the new event handler. The matched is control object directs the events to the new event handler and this pairing stays in place until its workflow processing is complete. The control object is also used as a source of display page references, which are to be displayed for specific workflow states. At completion, the event handler, will perform a "pop" operation from the context repository, to restore the session context of the event handler that preceded it. Subsequent user interactions are forwarded to that event handler. The function that performs this action is embedded in the abstract parent class for all event handlers.

(EE)

```
private void restoreCallerContext( )
    {
        ContextRepository contextSet =
(ContextRepository)
getRequest( ).getSession( ).getAttribute("commonContextRepository
");
        logger.debug(contextSet.toString( ));
        ContextGroup parentContext =
contextSet.popContext( );
        logger.debug(parentContext.toString( ));
        // Retrieve the context objects needed by parent
workflow
        int contextSize = parentContext.getNumObjects( );
        for(int i=0; i < contextSize; i++)
        {
            logger.debug("restoring object");
            Object currentContextObj =
parentContext.getContextObject(i);
            String currentContextObjName =
parentContext.getContextObjectScopeName(i);
            logger.debug("object name:" +
```

(EE)
-continued

```
currentContextObjName);
            // Restoration of an individual object to the
session scope
            getRequest( ).getSession( ).setAttribute(currentContext
        ObjName, currentContextObj);
        }
    }
```

The invocation of the context to the parent workflow is available explicitly to the individual workflows, as well as provided by default for specific events; In this case, the cancellation event. The common action is handled by the event handler common parent class, and inherited by all event handlers (see for example, FF).

(FF)

```
public ISoarianDispatcher doCommonAction( ) throws
SoarianSystemException {
        Control control = (Control)
getRequest( ).getSession( ).getAttribute(CONTROL_KEY);
        if (control != null) {
            Class wellEventHandlerClass =
control.getWellEventHandler( );
            String action = getAction( );
            if (action != null &&
action.equals(CANCEL_ACTION_KEY)) {
                returnToCallerWorkflow( );
                return new
ForwardDispatcher(TOPLEVEL_JSP);
            }
        ...
```

Figure 4:
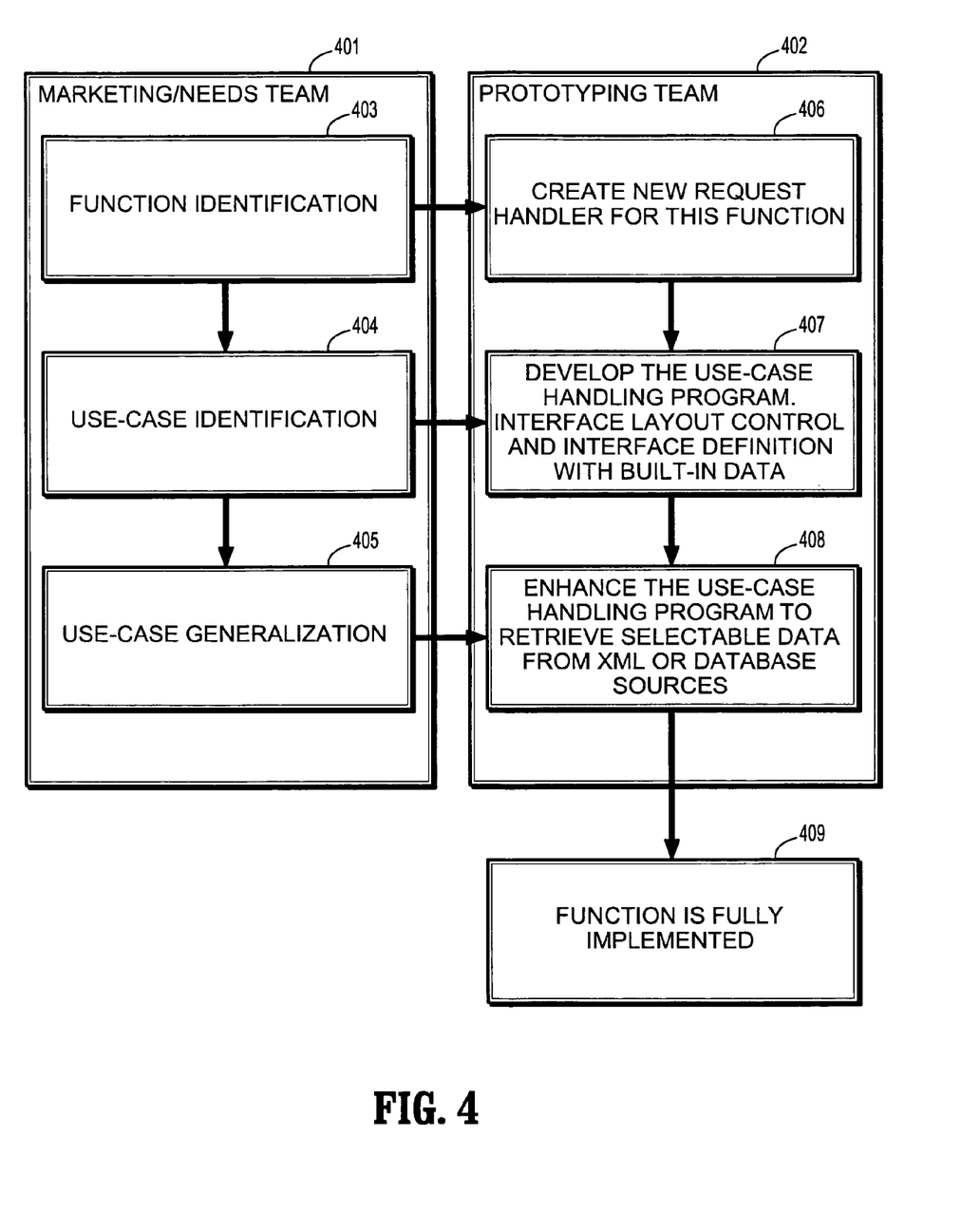
FIG. 4 is a flow chart of an evolutionary development method according to an embodiment of the present disclosure.

The architecture enables an evolutionary software prototyping process. FIG. 4 illustrates what software architectural components should be developed at the different stages of the prototype.

Referring to FIG. 4, a use-case group 401, which determines the needs of the client, works with a prototyping group 402 in the development and maintenance of a software product. The use-case group identifies functions needed by the client 403, identifies use-cases excepted by the client 404 based on identified functions, and determines a generalization of identified use-cases 405. The functions, use-cases and generalizations are supplied to the prototyping group 402. From the identified functions 403, the prototyping group 402 creates a request handler for each function 406. The prototyping group 402 develops a use-case handling program, interface layout control and interface definition with a built-in date 407 from the identified use-case 404 and using knowledge of the request handler 406. The use-case handling program is enhanced to receive data 408 including selectable XML data and/or semi-complete data. An implemented function is provided to the client 409, wherein the implemented function is modified to receive user-input data.

According to an embodiment of the present disclosure, an architecture for software development supports the implementation of use-cases under a server-page based architecture (e.g., JSP). The architecture supports a systematic process to evolving a software prototype to a software product with the evolving software requirements and the reuse of existing system components to compose new system requirements, easing the system maintenance. The architecture enables the vertical validation of the software architecture (from user interface, to backend logic, and to the data store), exploring the feasibility and provides the real functionalities as an evolutionary software prototype.

The architecture supports the implementation of use-cases for a server-page based web software prototype by customizing an MVC (Model, View and Control) design pattern. The MVC design pattern enforces the separation between input, processing, and output of the software application. The software application is divided into three components: the model, the view, and the controller. Each of these components handles a discreet set of tasks.

The architecture enables an explicit and systematic way to evolve a use-case to a software function of the software application. Since the architecture supports the direct linking of the supported use-cases, it can support the change of system behaviors consistently over the different use-cases. Further, the architecture makes tracing from the requirements to the software code easier and thus eases the modification of the software with the evolving software requirements. The implementation of use-cases under a server-page based architecture (e.g., JSP) is supported. The architecture further supports a systematic process to evolving a software prototype to a software product with the evolving software requirements. The architecture supports the reuse of existing system components to compose new system requirements, easing the system maintenance. The architecture enables the vertical validation of the software architecture (e.g., from user interface, to backend logic, and to the data store), exploring the feasibility and provides the real functionalities as an evolutionary software prototype.

According to an embodiment of the present disclosure, the UI screen name or web page name may be used to drive the software prototyping process. The software architecture dispatches the requests from different screens or web pages to different screen handlers. Since certain use-cases are supported by certain web pages, this can achieve similar functionalities.

The Java application or Java applet technologies can be used to build the web-based software applications and substituted for the server-page technology.

While the architecture has been described in terms of a health care information system, the architecture is not limited thereto and can be deployed for any software development that uses the server page technology.

The architecture defines a server-page based software architecture that is driven by the use-case and can support evolutionarily adding new functions to a software product. The data access and storing methods (e.g., built-in data, selectable XML data, and complete data) are defined during development/maintenance that can be used at different stages of the prototyping.

The architecture can be used to evolutionarily develop use-case oriented business applications that are built upon server-page (e.g., JSP) technologies.

It is to be understood that the present invention may be implemented in various forms of hardware, software, firmware, special purpose processors, or a combination thereof. In one embodiment, the present invention may be implemented in software as an application program tangibly embodied on a program storage device or computer readable medium. The application program may be uploaded to, and executed by, a machine comprising any suitable architecture.

Figure 5:
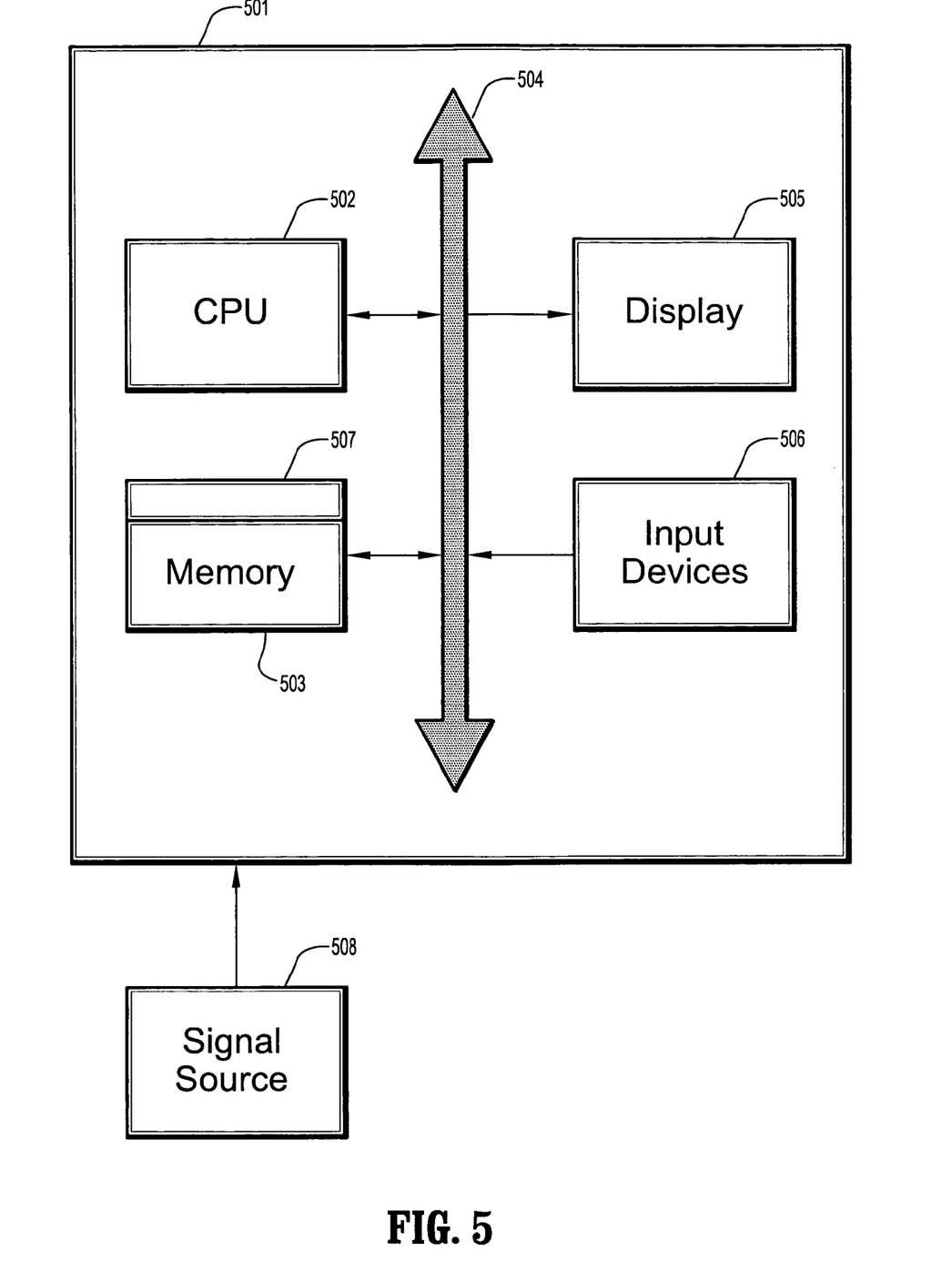
FIG. 5 is a diagram of a system according to an embodiment of the present disclosure.

Referring to FIG. 5, according to an embodiment of the present invention, a computer system 501 for implementing an architecture for use-case development of a software application can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or is configurations of the present invention.

Having described embodiments for a system and method for use-case development of a software application, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer system for use-case software development comprising:
   a client-side processor executing computer code for an interface renderer for interpreting a user interface definition code and displaying a user interface; and
   a server-side processor executing computer code for:
   a request dispatcher for processing a request from the interface renderer;
   a request handler for processing the request and checking a use-case name contained in the request;
   a use-case handling program, invoked by the request handler, for performing logic defined by a use-case for implementing a feature corresponding to the use-case name and according to a use-case state and returning an interface definition specifying an interface layout and controls that are interpretable by the interface renderer, wherein the use-case handling program determines a modification to the feature implemented by the use case and determines at least one additional use-case related to the use-case and changes the at least one additional use-case to invoke the feature to change a system behavior consistently over the related use-cases, wherein each use-case is a unique description of a client interaction with a software application for implemented the feature; and a server page container for receiving the interface definition and providing the user interface definition code to the interface renderer in response to the request from the interface renderer.

2. The computer system for use-case software development of claim 1, wherein the request dispatcher determines that the request handler is responsible for the request and assigns the request to the request handler.

3. The computer system for use-case software development of claim 2, wherein the request includes a pattern of a uniform resource locator, and the request dispatcher determines which request handler the request is assigned to according to the uniform resource locator.

4. The computer system for use-case software development of claim 1, wherein the interface definition reads an interface layout control of the user-case handling program and determines the interface layout to be displayed.

5. The computer system for use-case software development of claim 1, further comprising:
a built-in data component hard-coded in the use-case handling program;
a selectable data component loaded into the use-case handling program based upon a user selection; and
a semi-complete data component representing a data set for implementing variants of the use-case.

6. The computer system for use-case software development of claim 5, wherein each of the built-in data component, the selectable data component and the semi-complete data component correspond to different levels of development of the use-case.

7. The computer system for use-case software development of claim 1, wherein the use-case handling program links a plurality of use-cases together as the software application.

8. A non-transitory computer readable medium embodying instructions executed by a processor to perform a method for development of a software application comprising:
receiving a request for an identified function by a request handler;
receiving a use-case by a handling program code, an interface layout control code and an interface definition comprising built-in data, wherein the handling program code links related use-case implementations to the software application for implementing the identified function consistently over the related use-case implementations, and wherein each use-case is a unique description of a client interaction with the software application for implemented the identified function;
receiving a generalization of at least one use-case implementation of the related use case implementations;
receiving a first modification of the at least one use-case implementation to retrieve predetermined selectable data according to the generalization; and
receiving a second modification of the at least one use-case implementation to receive user-input data,
wherein the handling program code is processed according to a use-case state and returns an interface definition supporting the identified function for user interaction for each of the related use-case implementations.

9. The non-transitory computer readable medium of claim 8, wherein the handling program code links the related use-case implementations to one or more other use-case implementations of the web-based software application.

* * * * *